United States Patent [19]

Yamaguchi

[11] Patent Number: 4,835,968
[45] Date of Patent: Jun. 6, 1989

[54] HYDRAULIC CIRCUIT IN AN INDUSTRIAL VEHICLE

[75] Inventor: Yutaka Yamaguchi, Kariya, Japan

[73] Assignee: Kabushiki Kaisha Toyoda Jidoshokki Seisakusho, Kariya, Japan

[21] Appl. No.: 196,834

[22] Filed: May 9, 1988

Related U.S. Application Data

[63] Continuation of Ser. No. 894,778, Aug. 8, 1986, abandoned.

[30] Foreign Application Priority Data

Aug. 13, 1985 [JP] Japan .................................. 60-123609

[51] Int. Cl.4 .............................................. F15B 13/09
[52] U.S. Cl. ...................................... 60/422; 60/484; 60/486
[58] Field of Search ........................ 60/486, 484, 422

[56] References Cited

U.S. PATENT DOCUMENTS 3,898,810  8/1975  Ohba .............................. 60/486 X

FOREIGN PATENT DOCUMENTS 59-63252  4/1984  Japan .................................. 60/422

Primary Examiner—Gerald A. Michalsky
Attorney, Agent, or Firm—Brooks Haidt Haffner & Delahunty

[57] ABSTRACT

Hydraulic circuit in an industrial vehicle, which comprises: a cargo-steering hydraulic circuit, flow rate of which is large and pressure of which is high; and a booster hydraulic circuit, flow rate of which is small and pressure of which is medium; the hydraulic circuits being independent from each other; the cargo-steering hydraulic circuit being communicated with a hydraulic pump, flow rate of which is large and pressure of which is high; and the booster hydraulic circuit being communicated with a hydraulic pump, flow rate of which is small and pressure of which is high.

7 Claims, 1 Drawing Sheet ly pump P to a carge hydraulic circuit, such as
HYDRAULIC CIRCUIT IN AN INDUSTRIAL VEHICLE This application is a continuation of application Ser. No. 894,778, filed Aug. 8, 1986, now abandoned.

TECHNICAL FIELD OF THE INVENTION

The present invention relates to a hydraulic circuit in an industrial vehicle, such as a fork lift truck, which is a vehicle used for loading and unloading of vessels in a workshop. More specifically, the present invention relates to an oil hydraulic circuit in an industrial vehicle, which comprises a cargo hydraulic circuit for actuating a lifting cylinder or a tilting cylinder by a working fluid having a high pressure at a large flow rate, a steering hydraulic circuit for actuating, for example, a power steering device by a working fluid having a relatively low pressure at a medium flow rate, and a booster hydraulic circuit for actuating, for example, a brake valve or a clutch booster by a working fluid having a medium pressure at a small flow rate.

PRIOR ART

In a conventional oil hydraulic circuit installed in an industrial vehicle, such as a fork lift truck, working fluid fed from a hydraulic pump to a cargo hydraulic circuit, such as a lifting cylinder or a tilting cylinder, is divided into a booster circuit, a power steering circuit and a return circuit by means of a flow divider disposed in a flow control valve.

PROBLEMS TO BE SOLVED BY THE INVENTION

The booster circuit, such as a brake valve or a clutch booster, requires a small flow rate of at least about 5 l/min at a medium pressure, for example 30 kg/cm$^2$. Contrary to this, the power steering hydraulic circuit, such as a steering gear box, always requires a large flow rate, for example 12 l/min, though the pressure is low, for example, 10 kg/cm$^2$.

In order to meet with the different requirements, in the conventional hydraulic circuit, the pressure of all the working fluid is once raised to a medium pressure, which is needed in the booster circuit, by a hydraulic pump, and is delivered from the hydraulic pump. When the fork lift truck is in a moving condition, wherein the cargo hydraulic circuit is not operated, though the brake valve, the clutch booster and the steering gear box are operated, the amount of the working fluid required for the operation of the brake valve, the clutch booster and the steering gear box is only a part of all the delivered flow rate. Almost all the working fluid, for example, about 80% of all the working fluid, raised at a medium pressure is relieved to the tank through the return circuit. Thus an energy loss is caused. As a result, there may occur problems that an engine directly connected to the hydraulic pump is over heated, that the mileage of the truck is degraded, i.e., the amount of fuel consumed for a required work increases, that the working fluid in the hydraulic circuit is easily deteriorated, and that the lifetime of the hydraulic equipments is shortened.

OBJECT OF THE INVENTION

An object of the present invention is to provide a hydraulic circuit installed in an industrial vehicle, such as a fork lift truck, which can obviate the above-described problems inherent to the conventional hydraulic circuit in an industrial vehicle, such as overheating of an engine, low mileage, deterioration of working fluid, short lifetime of hydraulic equipments.

SUMMARY OF THE INVENTION

According to the present invention, the above-described object is achieved by a hydraulic circuit in an industrial vehicle, which comprises a cargo-steering hydraulic circuit, flow rate of which is large and pressure of which is high, and a booster hydraulic circuit, flow rate of which is small and pressure of which is medium, the hydraulic circuits being independent from each other, said cargo-steering hydraulic circuit being in communication with a hydraulic pump, the flow rate of which is large and pressure of which is high, and a booster hydraulic circuit being communication with a hydraulic pump, the flow rate of which is small and pressure of which is high.

The hydraulic circuit in an industrial vehicle according to the present invention is divided into a cargo-steering hydraulic circuit, the flow rate of which is large and pressure of which is high, and a booster hydraulic circuit, the flow rate of which is small and pressure of which is medium, the circuits being independent from each other. The cargo-steering hydraulic circuit, the flow rate of which is large and pressure of which is high, is in communication with a hydraulic pump, flow rate of which is large and pressure of which is high. The booster hydraulic circuit, the flow rate of which is small and pressure of which is medium, is communication with another hydraulic pump, the flow rate of which is small and pressure of which is high.

Since the booster hydraulic circuit, the flow rate of which is small and pressure of which is medium, is formed independent from the cargo-steering hydraulic circuit, the flow rate of which is large and pressure of which is high, and is supplied with working fluid by a small hydraulic pump, a large amount of working fluid is relieved from the cargo-steering hydraulic circuit when the booster is working. The relief pressure of the working fluid, at which the working fluid is relieved, can be lowered compared with that in a conventional hydraulic circuit. For example, 40 kg/cm$^2$ in a conventional circuit can be lowered to 10 kg/cm$^2$ in the hydraulic circuit of the present invention. As a result, the energy loss upon relief of working fluid, which can be calculated by multiplying the relief pressure with the relief flow rate, can be remarkably decreased.

BRIEF DESCRIPTION OF THE DRAWINGS

The present invention will now be explained in detail referring to the accompanying drawings, wherein.

PREFERRED EMBODIMENT

Figure 2:
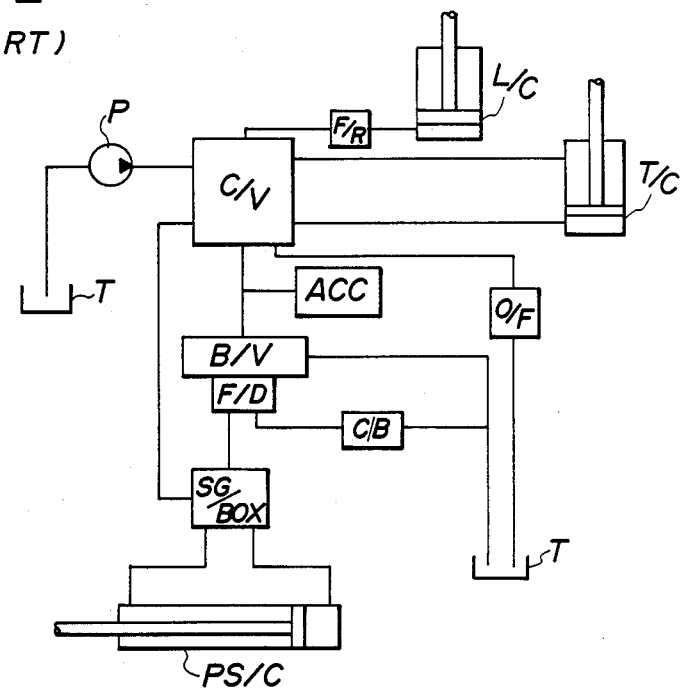
FIG. 2 is a schematic diagram of a conventional hydraulic circuit.

Referring to FIG. 2, wherein a conventional hydraulic circuit installed in an industrial vehicle, such as a fork lift truck, is illustrated, working fluid fed from a hydraulic pump P to a carge hydraulic circuit, such as a lifting cylinder L/C or a tilting cylinder T/C, is divided into a booster circuit, such as a brake valve B/V or a clutch booster C/B, a power steering circuit, such as a steering gear box SG/BOX, and a return circuit, by means of a flow divider F/D disposed in a flow control valve C/V.

As described above, the booster circuit, such as the brake valve B/V or the clutch booster C/B, requires a small flow rate of at least about 5 l/min at a medium pressure, for example 30 kg/cm$^2$. Contrary to this, the power steering hydraulic circuit, such as a steering gear box SG/BOX, always requires a large flow rate, for example 12 l/min, though the pressure is low, for example, 10 kg/cm$^2$.

In the conventional hydraulic circuit, the pressure of all the working fluid is raised to a medium pressure, which is needed in the booster circuit, by a hydraulic pump and is delivered from the hydraulic pump P. When the fork lift truck is in a moving condition, wherein the cargo hydraulic circuit is not operated, though the brake valve B/V, the clutch booster C/B and the steering gear box SG/BOX are operated, the amount of the working fluid required for the operation of the brake valve B/V, the clutch booster C/B and the steering gear box SG/BOX is only a part of all the delivered flow rate. Almost all the working fluid, for example, about 80% of all the working fluid, raised at a medium pressure is relieved to the tank through the return circuit. Thus an energy loss occurs. As a result, there may occur problems that an engine directly connected to the hydraulic pump is over heated, that the mileage of the truck is degraded, i.e., the amount of fuel consumed for a required work increases, that the working fluid in the hydraulic circuit is easily deteriorated, and that the lifetime of the hydraulic equipments is shortened.

The present invention is intended to obviate the above-described problems inherent to the conventional hydraulic circuit in an industrial vehicle as described in the previous paragraph, such as overheating of an engine, low mileage, deterioration of working fluid, short lifetime of hydraulic equipments.

Figure 1:
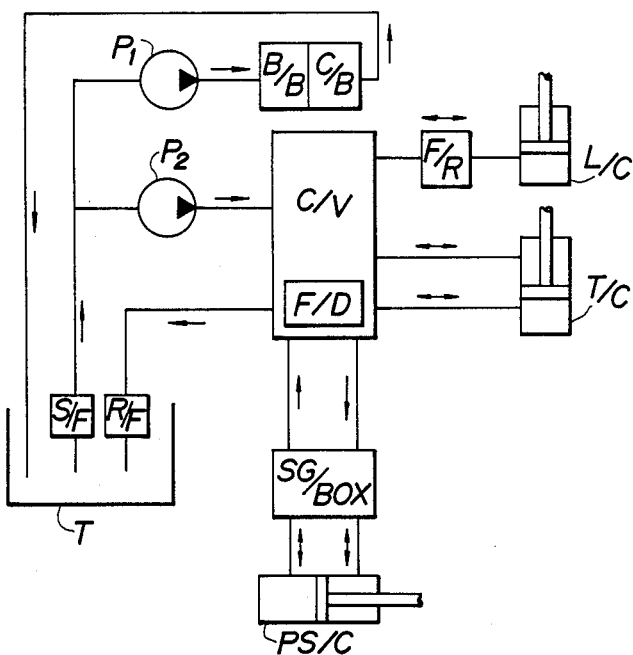
FIG. 1 is a schematic diagram of a hydraulic circuit according to the present invention.

FIG. 1 illustrates an embodiment of the present invention, wherein an oil tank T is in communication with an oil hydraulic pump $P_1$, the flow rate of which is small and pressure of which is high, through a suction filter S/F, and the oil hydraulic pump $P_1$ is further in communication with the oil tank T through a booster hydraulic circuit, flow rate of which is small, pressure of which is medium and which includes a brake booster B/B and a clutch booster C/B.

Further, a control valve C/V is in communication with the downstream of the suction filter S/F through an oil hydraulic pump $P_2$, the flow rate of which is large and pressure of which is high. The control valve C/V is further in communication with the oil tank T through a return filter R/F.

The control valve C/V is in communication with a cargo hydraulic circuit, flow rate of which is large and pressure of which is high. More specifically, the control valve C/V is in communication with a lifting cylinder L/C through a flow regulator F/R and with a tilting cylinder T/C without having any flow regulator F/R therebetween.

Further, the control valve C/V is in communication with a steering hydraulic circuit through a flow divider F/D disposed within the control valve C/V. More specifically, the flow divider F/D is in communication with a steering gear box SG/BOX and a power steering cylinder PS/C.

As described above, the hydraulic circuit of the present invention is divided into a plurality of sub-circuits, which are independent from each other, i.e., the cargo-steering hydraulic circuit and the booster hydraulic circuit. The cargo hydraulic circuit, the flow rate of which is large and the pressure of which is high, includes the lifting cylinder L/C and the tilting cylinder. The steering hydraulic circuit, the flow rate of which is large and the pressure of which is high, includes the steering gear box SG/BOX and the power steering cylinder PS/C. The booster hydraulic circuit, the flow rate of which is small and the pressure of which is medium, includes the brake booster B/B and the clutch booster C/B. The cargo-steering hydraulic circuit, the flow rate of which is large and the pressure of which is high, is in communication with the oil hydraulic pump $P_2$, the flow rate of which is large and the pressure of which is high, while the booster hydraulic circuit, the flow rate of which is small and the pressure of which is medium, is in communication with the oil hydraulic pump $P_1$, the flow rate of which is small and the pressure of which is high.

Since the booster hydraulic circuit, the flow rate of which is small and pressure of which is medium, is formed independent from the cargo-steering hydraulic circuit and is supplied with working fluid by a small hydraulic pump $P_1$, a large amount of working fluid is relieved from the cargo-steering hydraulic circuit when the booster is working. The pressure of the working fluid, at which the working fluid is relieved, can be lowered compared with that in a conventional hydraulic circuit. For example, 40 kg/cm$^2$ in a conventional circuit can be lowered to 10 kg/cm$^2$ in the hydraulic circuit of the present invention. As a result, the energy loss upon relief of working fluid, which can be calculated by multiplying the relief pressure with the relief flow rate, can be remarkably decreased.

Thus, it can be seen from the foregoing description, that the demand for a relatively high rate of flow of hydraulic fluid for the functions of cargo lifting and tilting and for power steering is accomodated by use of a circuit which is independent from the separate hydraulic circuit which provides a relatively low rate of flow of hydraulic fluid required by the brake booster B/B and the clutch booster C/B. Accordingly, the cargo-steering hydraulic circuit, which operates at a large flow rate under high pressure, has its own hydraulic pump $P_2$ providing a high flow rate at high pressure, while the booster hydraulic circuit, with its smaller flow rate at lower pressure is also served by its own hydraulic pump $P_1$, operating at a lower flow rate than the pump $P_2$.

ADVANTAGES OF THE INVENTION

The hydraulic circuit in an industrial vehicle according to the present invention is divided into a cargo-steering hydraulic circuit, flow rate of which is large and pressure of which is high, and a booster hydraulic circuit, flow rate of which is small and pressure of which is medium, the circuits being independent from each other. The cargo-steering hydraulic circuit, flow rate of which is large and pressure of which is high, is in communication with a hydraulic pump, flow rate of which is large and pressure of which is high. The booster hydraulic circuit, flow rate of which is small and pressure of which is medium, is in communication with a hydraulic pump, flow rate of which is small and pressure of which is high.

Since the booster hydraulic circuit, flow rate of which is small and pressure of which is medium, is formed independent from the cargo-steering hydraulic circuit and is supplied with working fluid by a small hydraulic pump, a large amount of working fluid is relieved from the cargo-steering hydraulic circuit when the booster is working. The relief pressure of the working fluid, at which the working fluid is relieved, can be lowered compared with that in a conventional hydraulic circuit. For example, 40 kg/cm$^2$ in a conventional circuit can be lowered to 10 kg/cm$^2$ in the hydraulic circuit of the present invention. As a result, the energy loss upon relief of working fluid, which can be calculated by multiplying the relief pressure with the relief flow rate, can be remarkably decreased.

Thus the present invention provides a hydraulic circuit installed in an industrial vehicle, such as a fork lift truck, which can obviate the problems inherent to the conventional hydraulic circuit in an industrial vehicle. In other words, the present invention can prevent an engine from being over heated, can improve mileage of an vehicle, can prevent work fluid in the hydraulic circuit from being readily deteriorated and can prolong lifetime of hydraulic equipments.

What is claimed is:

1. Hydraulic circuit in an industrial vehicle, which comprises:

a cargo handling and steering first hydraulic circuit, the flow rate of which is large and pressure of which is high, said circuit including cargo lifting and vehicle steering apparatus; and a separate and independent booster hydraulic second circuit, the flow rate of which is smaller than that of said first circuit and pressure of which is less than that of said first circuit, said second circuit including vehicle movement controlling apparatus;

said hydraulic circuits being independent from each other and without a fluid flow connection therebetween so that a substantial amount of working fluid is relieved from the cargo handling and steering first hydraulic circuit when the booster hydraulic circuit is working;

said cargo handling and steering first hydraulic circuit having a hydraulic pump, the flow rate of which is large and pressure of which is high; and said booster hydraulic second circuit having a hydraulic pump, the flow rate of which is smaller than that of the pump of said first circuit and pressure of which is high.

2. The hydraulic circuit of claim 1 wherein said cargo handling and steering first circuit includes a control valve for said cargo lifting apparatus and which includes a flow divider connected to said steering apparatus for supplying hydraulic fluid to said steering apparatus from said control valve through said flow divider.

3. The hydraulic circuit of claim 1 wherein both said first and second circuits are supplied with fluid from the same tank.

4. The hydraulic circuit of claim 1 wherein said vehicle movement controlling apparatus includes a brake booster and a clutch booster.

5. The hydraulic cylinder of claim 1 wherein said cargo lifting apparatus includes a lifting cylinder and a tilting cylinder.

6. Hydraulic circuit in a cargo handling industrial vehicle, including: a high-pressure pump for delivering hydraulic fluid at a high flow rate to a hydraulic circuit which serves to drive both cargo handling cylinder means and power steering cylinder means; control valve means connected to said high pressure pump and which includes flow dividing means connected to said power steering means for supplying hydraulic fluid from said control valve means to said power steering cylinder means through said flow dividing means, a booster pump operating at a lower flow rate than said high pressure pump, said booster pump serving a brake booster and a clutch booster in a hydraulic booster circuit separate from the circuit served by said high pressure pump and operating at a pressure lower than said circuit served by said high pressure pump, said booster circuit and said circuit served by said high pressure pump being without a fluid flow connection therebetween.

7. The circuit of claim 6 wherein said cargo handling cylinder means include a cargo-lifting cylinder and a cargo-tilting cylinder.

* * * * *